United States Patent [19]

Klein

[11] 4,394,146
[45] Jul. 19, 1983

[54] FILTER APPARATUS

[75] Inventor: Max Klein, Shrewsbury, N.J.

[73] Assignee: Crane & Co., Inc., Dalton, Mass. ; a part interest

[21] Appl. No.: 306,694

[22] Filed: Sep. 29, 1981

[51] Int. Cl.³ .............................................. B01D 46/18
[52] U.S. Cl. ....................................... 55/354; 55/390; 55/524; 209/307
[58] Field of Search .................. 55/149, 290, 351–354, 55/390, 524, 527, 528; 210/387, 400, 401; 209/307, 308; 34/116, 123; 162/146, 156

[56] References Cited

U.S. PATENT DOCUMENTS

| | | | |
|---|---|---|---|
| 1,949,002 | 2/1934 | Annis | 55/290 |
| 2,119,978 | 7/1933 | Wolthuis et al. | 183/62 |
| 3,228,825 | 1/1966 | Waggoner | 162/156 |
| 3,280,538 | 5/1963 | Schwarz | 55/354 |
| 3,348,366 | 9/1963 | Bennett | 55/354 |
| 3,406,503 | 7/1965 | Floyd | 55/354 |
| 3,552,099 | 4/1968 | Floyd | 55/354 |
| 3,573,158 | 3/1971 | Pall et al. | 162/146 |
| 3,622,445 | 11/1971 | Heidweiller | 162/156 |
| 3,675,393 | 7/1972 | Meade | 55/96 |
| 3,749,638 | 7/1973 | Renaud et al. | 162/156 |
| 3,902,455 | 9/1975 | Lehmann et al. | 55/351 |
| 3,965,011 | 6/1976 | Sheaffer | 210/31 |
| 4,054,521 | 10/1977 | Winzen | 210/137 |
| 4,227,899 | 10/1980 | Meny et al. | 55/528 |
| 4,229,187 | 10/1980 | Stockford et al. | 55/14 |
| 4,239,516 | 12/1980 | Klein | 55/389 |
| 4,293,378 | 10/1981 | Klein | 55/528 |

OTHER PUBLICATIONS

Mitsubishi Air Cleaner.

Primary Examiner—David L. Lacey
Attorney, Agent, or Firm—Dann, Dorfman, Herrell and Skillman

[57] ABSTRACT

Filtration apparatus in which the filter medium is in the form of a mat assembled with a support grid which is caused to traverse through a filter chamber in a zig zag path. The mat and support grid extend between the side walls of the filter chamber and are advanced by turning rolls disposed at upper and lower levels. The support grid for the filter mat extends between sealing flanges projecting from the side walls of the filter chamber and auxiliary support for the support grid may be provided by employing a foraminous shelf extending between the flanges. The filter medium is disposed so that its edges overlie the sealing flanges, thereby preventing flow of gaseous medium around the edges of the filter mat. Sealing engagement between the sealing flanges and the filter mat is assured by the inclusion of a series of apertures spaced along the length of the flanges. The undersurface of the filter mat faces the downstream side of the filter housing so that the reduced pressure downstream of the filter mat is applied to the undersurface of the filter mat and effects firm engagement with the flanges.

10 Claims, 4 Drawing Figures

FILTER APPARATUS

FIELD OF THE INVENTION

The present invention relates to filter apparatus, and more particularly to roll filters in which the filter medium comprises a web of filter material which is advanced through the filter chamber transversely to the flow of gaseous medium therethrough, the particulate material entrapped by the filter medium being carried out of the filter chamber with the spent filter medium.

BACKGROUND OF THE INVENTION

In order to enable the use of a filter medium which does not posses sufficient rigidity to be self-supporting, a roll type filter apparatus has been provided in which an endless flexible mesh grid is caused to travel through the filter chamber and the filter medium comprises a web of filter material deposited on the mesh grid and carried by the grid through the filter chamber. The supporting grid is in the form of an endless band which recirculates through the filter chamber, for example in a zig zag path between two series of guide rolls extending respectively across the gas inlet and gas outlet sides of this filter chamber. The filter web or mat is fed into the filter chamber onto the supporting grid at one end and is withdrawn from the other end. In this fashion the gaseous flow through the filter chamber is caused to flow through the filter mat deposited on the mesh grid thereby filtering out particulate material from the gaseous flow.

With filter apparatus of this character, there is a tendency, particularly when the filter medium is dense and offers a high resistance to gaseous flow through it, for the gaseous medium to pass around the edges of the filter medium between the side walls of the filter chamber and the side edges of the filter medium along the marginal portions of the endless grid.

Prior to the present invention, the problem of leakage of dirty air around the edges of the filter medium has been addressed by the provision of a special trackway in the side edges of the filter chamber which is designed to accomodate the filter medium as it is advanced through the filter chamber. For example, as shown in U.S. Pat. No. 3,280,538, the construction of the trackway for the filter medium is effective if the filter medium is readily compressible so that the track arrangement may compressively engage the edges of the filter medium and provide a seal against the escape of gaseous medium around the edges. Such an arrangement not only requires substantial thickness and compressability in the filter web, but also requires that the filter web accurately track within the guideways so that lateral displacement of the web does not effect disengagement of the web from the guideways. Where the filter web is thin and flexible and is not possessed of a high degree of compressability, the arrangement shown in this patent is not satisfactory.

A similar arrangement is shown in U.S. Pat. No. 3,552,099 wherein the filter web is carried by a wire mesh conveyor having an edge form which rides in a track along the side walls of the filter chamber. A sealing flap overlies the track to engage against the exposed surface of the filter web on the wire conveyor to seal against the web and prevent leakage of gaseous medium between the web and the side wall. Where the web material is not resistant to abrasion, such a sealing arrangement tends to cause separation of the web material and enables leakage through the separations produced.

It has also been proposed as shown in U.S. Pat. No. 3,406,503 to utilize a filter blanket having an edge construction formed to travel in a guideway in the side walls of the filter chamber, the edge construction either being an integral part of the filter blanket or being a strip applied to the edge of the filter material and having a beaded construction adapted to ride in the guideways. Such an arrangement requires the filter material to be designed specifically to accomodate to the trackway arrangement in the filter chamber and substantially increases the cost of the filter material.

SUMMARY OF THE INVENTION

With the foregoing in mind the present invention provides a filter arrangement of the roll type in which the filter medium is carried through the filter chamber by an endless grid and the side walls are provided with a flange construction adjacent to the side edges of the grid so that a filter medium may be deposited on the grid to overlap the flange construction and thereby thoroughly filter the gaseous flow passing through the filter chamber, the flanges being specially constructed to use the differential pressure across the filter medium to minimize leakage of the gaseous flow around the edges of the filter medium.

More specifically, the present invention contemplates a filter chamber having side walls with guide means therebetween for directing the traverse of a grid conveyor through the chamber, the flange construction comprising perforate strip means extending outwardly from the side walls to engage under the filter web to seal thereagainst as the mesh grid is caused to travel through the filter chamber, the filter web being deposited on the mesh grid across its full width to constitute a filter medium which overlaps the perforate edge strips or flanges at opposite sides thereof.

A particular feature of the present invention resides in the presence of guide supports for the medium between the side walls of the filter chamber to assist in maintaining sealing engagement of said medium with the flange construction.

BRIEF DESCRIPTION OF THE DRAWINGS

These and other features of the invention are more fully set forth hereinafter in the following description made with reference to the accompanying drawing wherein.

DESCRIPTION OF A PREFERRED EMBODIMENT

Figure 1:
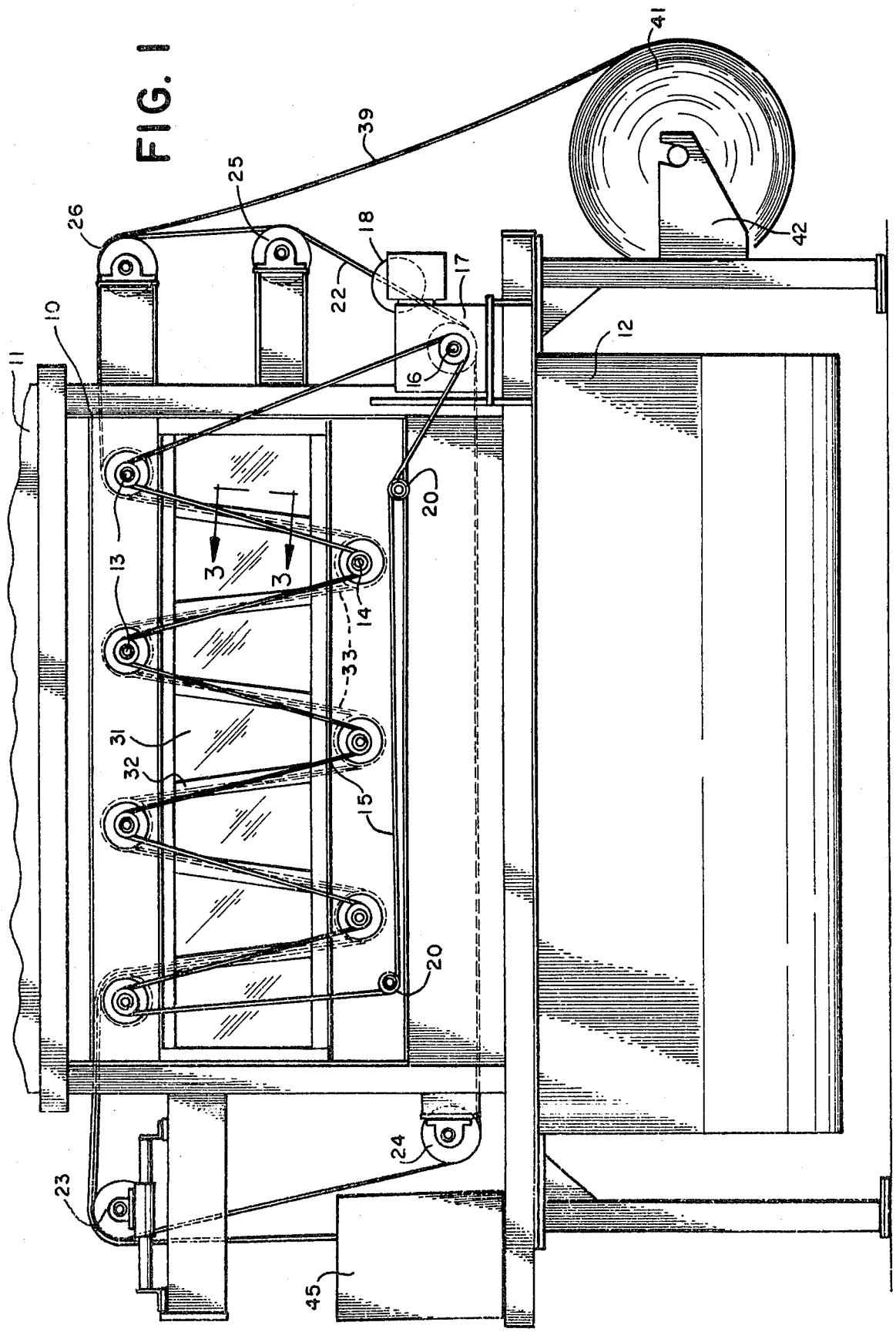
FIG. 1 is a view in side elevation illustrating a filter apparatus embodying the present invention.

As shown in FIG. 1, the filter apparatus comprises a filter chamber 10 having a dirty air supply chamber 11 at its upper end and a clean air discharge chamber 12 at its lower end so that the dirty air is caused to flow into the chamber 10 from its upper side and be discharged from the bottom side, depositing the particulate matter carried by the gaseous flow upon the upwardly facing surface of the filter medium in the chamber.

Figure 2:
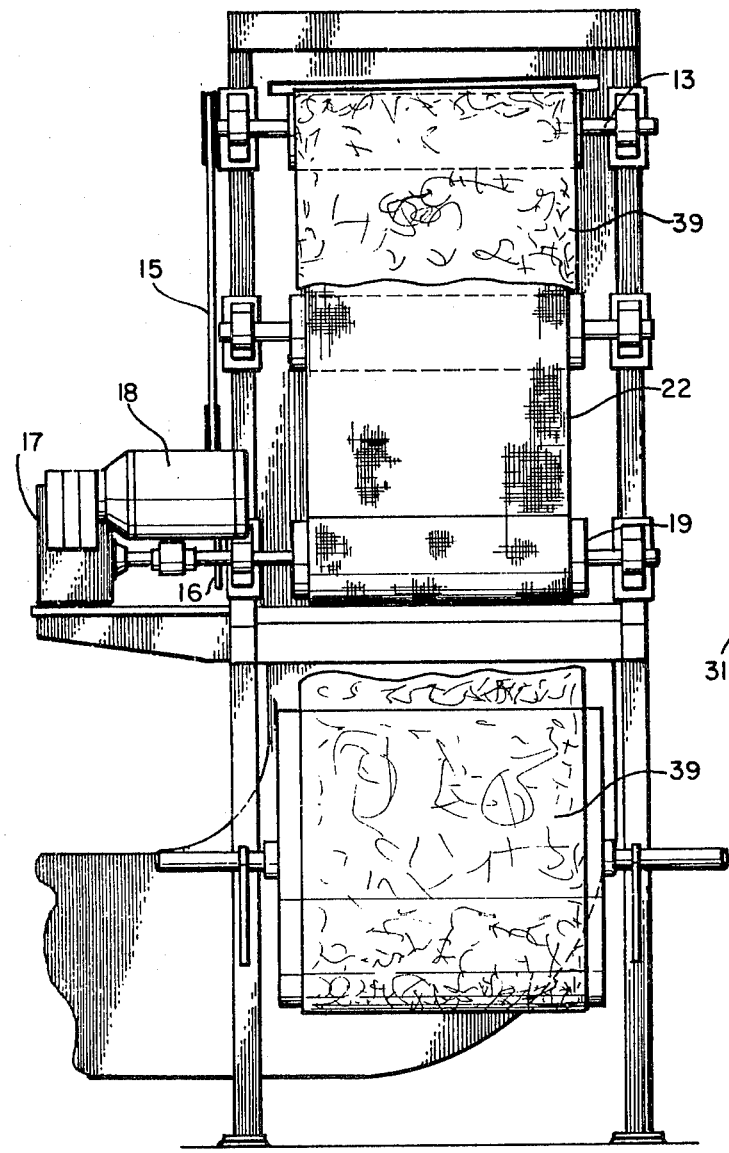
FIG. 2 is an end elevation as seen from the right hand end of FIG. 1.

The filter medium is disposed in the chamber in a zig-zag array, for example between upper and lower turning rolls 13 and 14 respectively. In the present instance the rolls 13 and 14 are of uniform diameter and are preferably in the form of slatted reels which permit gaseous flow through the portions of the filter medium which are disposed in contact with the rolls. The rolls are driven at a common speed by an external chain drive 15 trained over sprockets on the upper rolls 13 at the inlet side of the chamber and under sprockets on the lower rolls 14 at the inlet side of the chamber. As shown in FIG. 1 and in FIG. 2, the chain 15 is driven by a drive sprocket 16 through a drive train 17 from a motor 18. The drive sprocket 16 is carried on a shaft which mounts a roller 19 which is mounted externally of the filter chamber 10 at one end. Suitable sprockets or guide pulleys 20 are positioned to maintain the chain in driving engagement with the sprockets and to direct the chain in its return run below the sprockets on the rolls 13 and 14.

The filter medium has means to support it in the chamber 10. To this end, a support mesh grid 22 is formed in an endless loop having a zig-zag path portion over the rollers 13 and under the rollers 14. The grid exits from the filter chamber 10 at the far end and passes around an exit roll 23 and thereafter passes downwardly under an idler roll 24 and back through the chamber around the roll 19 onto entrance rollers 25 and 26. The journal bearings for the exit roll 23 are adjustable to assure proper tracking of the grid. The drive for the internal rollers 13 and 14 and the external roller 19 advances the support grid 22 in a generally leftward path over and under the rollers 13 and 14 and out the far end and then back to the right under the idler 24 to the external roller 19 and back to the entrance rollers 25 and 26.

The support grid 22 preferably comprises a woven PTFE/glass fabric screening impregnated with PTFE resins. The interstices of the screening fabric are suitably square with a weave density of six openings per inch in each direction. Such screen fabric is dimensionally stable from $-415°$ F. to $+600°$ F. and is resistant to both chemical degradation and abrasion. It has good breaking strength and tear strength, in thicknesses of 0.030 inch. A screen fabric of this character has unidirectional porosity, permitting free flow normal to the plane of the fabric but preventing lateral flow within the plane of the fabric. In this specification, including the claims, PTFE is to be read as polytetrafluoroethylene.

Figure 3:
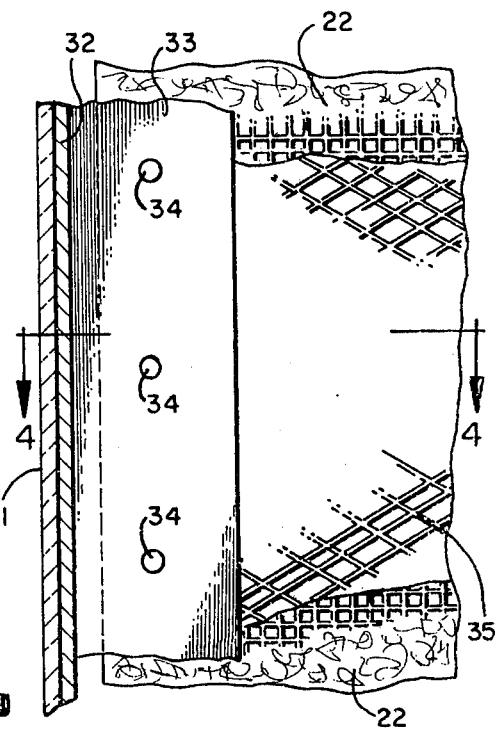
FIG. 3 is an enlarged sectional view taken on the line 3—3 of FIG. 1.
Figure 4:
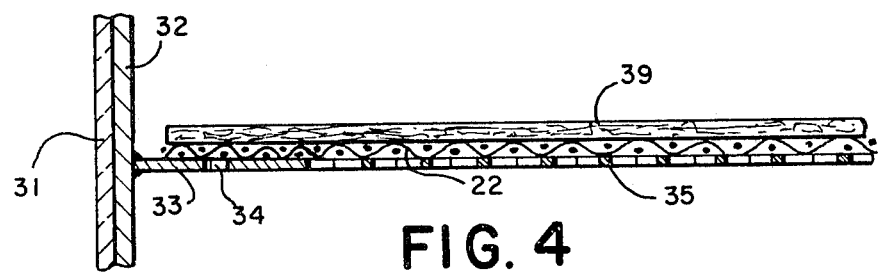
FIG. 4 is a further enlarged cross sectional view taken on line 4—4 of FIG. 3, through the filter medium, the supports and the guide means.

The filter as shown in FIG. 1 has a transparent wall section 31 and encloses the upper and lower turning rolls 13 and 14, forming a filter chamber through which the gaseous medium passes downwardly. As shown in FIG. 3, the mesh support grid 22 travels parallel to the wall 31 between the rollers 13 and 14, and the side walls of the chamber 10 are provided with side members 32 extending angularly between the upper and lower rolls and having inwardly directed flanges 33 to underlie the support grid 22 of the filter medium. As shown in FIG. 1, the flanges 33 of the members 32 are disposed tangential to the upper and lower rollers so that they track in registry with the mesh support grid 22. Between the flanges 33 a supplemental guiding support for the mesh grid is formed by a foraminous support shelf 35 secured to the flanges 33 and extending laterally below the filter medium between the flanges 33 on opposite sides of the chamber. The support shelf 35 is preferably comprised of an expanded metal grating which is flattened to provide a low coeffecient of friction with the mesh grid 22. The guiding support 35 between the flanges 33 serves to stabilize the filter medium as it travels in the zig zag path between the rollers 13 and 14. The stabilization afforded by the travel on the support 35 also avoids excessive deflection or vibration of the grid 22 during its advance through the filter chamber.

A filter mat is assembled with the grid 22 and is guided through the chamber 10 with the support grid 22. To this end the filter medium is in the form of a blanket or filter mat 39 which is deposited onto the support grid 22 adjacent the entrance roller 26 so that the grid 22 may carry the mat 39 through the chamber. In the present instance the mat 39 is supplied from a roll 41 which is journaled for rotation on brackets 42 underlying the entrance end of the filter chamber. Thus the free end of the filter blanket may be withdrawn from the roll 41 and engaged onto the support grid 22 and fed into the filter chamber 10 so that its edges overlap the flanges 33 along the opposite side edges of the grid. The filter mat confronts the pressure side of the filter chamber so that the pressure differential upstream and downstream of the filter mat in the filter chamber tends to press the filter mat 39 and the grid 22 against the flanges 33 along the edges thereof. The air pressure thus assists in engaging the filter medium with the flanges 33. When the filter mat 39 and grid 22 pass over the exit roll, the spent filter mat disengages the mesh grid, and in the present instance falls into a collecting bin 45 at the exit end of the filter chamber prior to the return of the mesh grid through the chamber.

It should be noted that the drive for the grid may be continuous so as to continuously introduce fresh filter medium into the filter chamber and withdraw the spent filter medium from the exit end of the chamber. Alternatively the support grid 22 may be advanced intermittently. In the latter case the filter medium is stationary in the filter chamber until such time as it is decided to change the filter medium so as to present a fresh filtering action. The advance of the filter medium may be initiated when proper filtering action is impaired, for example by sensors responsive to the loading of the filter media with the particulate material removed from the gaseous flow. It has been found effective to time the intermittent advance so that the filter medium advances a distance corresponding to the length of the filter medium between the upper and lower turning rolls 13 and 14. Alternatively the advance may be interrupted when the sensor indicates that proper filtering action is restored.

The pressure on the upstream side of the grid is higher than the pressure downstream of the grid in view of the pressure drop which is generated by the filter medium. Preferably the filter is operated in a push-pull fashion with blowers or fans both upstream and downstream of the filter chamber. Thus the positive air pressure on the exposed surface of the mat 39 tends to press the mat against the flanges 33, and the negative air pressure pulls the underside of the filter mat against the flanges. The use of positive pressure upstream of the filter medium and negative pressure downstream of the filter medium permits the filter chamber to be operated at a negative pressure with respect to ambient conditions, thereby avoiding the need for entry and exit portals for the filter medium. The negative pressure causes any air leakage to be directed inwardly into the filter chamber. Furthermore when the filter medium is loaded with particulate material sufficiently to impair its porosity, the positive pressure upstream of the filter medium will cause leakage of unfiltered gaseous medium at the entrance and exit ends of the filter chamber. This condition may be detected, for example by observing the escape of unfiltered gaseous medium.

In the present instance, the flange 33 constitutes a separate strip element welded to a base strip and extending continuously along the path of the mesh grid 22 between the entrance roller 26 and the exit roller 23. As shown in FIG. 3, the flange 33 has apertures 34 disposed at spaced intervals along its length in order to assure the sealing engagement of the filter medium, i.e. the mat 39 and its support mesh 22 on the flanges 33. In the present case, the flange 33 is approximately 1.5 inches in width and the apertures are spaced apart by about 4 inches and are located between the longitudinal center line of the flange 33 and the free edge thereof which is directed toward the interior of the filter chamber. The apertures 34 in the flanges serve to dispel any air cushion or co-anda effect which might tend to maintain the filter medium spaced from the flanges 33 or to separate the mat 39 from the support 22. The apertures 34 thereby assist in maintaining a close engagement of the filter medium on the flanges 33. This close engagement inhibits flow of gaseous medium through the space between the filter medium and the side walls of the filter chamber.

The filter mat 39 is preferably a paper-like non-woven web of the type disclosed in the Klein U.S. Pat. Nos. 4,239,516 and 4,293,278 and the entire disclosures of these patents are hereby incorporated into the present application by reference. It is sufficient to state that the filter mat comprises a loose web of glass fibers intermixed with micro-bits of an expanded thermoplastic styrene-polymer or expanded thermoplastic lower polyolefin or flexible foam polyurethane and suitable organic bonding agent. The mat may contain other additives or other consituents which function as molecular sieve particles or gas-absorption mechanisms for pollutants. The filter mat may be fabricated in various ways to provide the porosity and the filtration characteristics which are desired for a particular end use. For example, a filter mat made in paper-making apparatus in accordance with Example 1 of the aforesaid Klein U.S. Pat. No. 4,239,516, comprising polystyrene micro-bits, glass fibers and polyvinyl alcohol, has a porosity value of 602.8 liters per minute per square decimeter of surface at a pressure differential of 2.54 cm. of water (gauge). Another suitable filter mat is the mat described in Example 2 of Klein U.S. Pat. No. 4,293,378 which is also made using paper-making apparatus. The mat comprises glass fibers, the aforesaid polymer micro-bits, and an intimate blend or cobeat of polymer micro-bits, cellulose fibers and polyester fibers, together with polyvinyl alcohol as a binding agent and melamine-formaldehyde as a wet-stength enhancing agent. The porosity of the finished mat is generally from about 300 to about 1500 liters per minute per square decimater at a pressure differential of 2.54 cm. of water (gauge). The mat possesses excellent wet strength, which is on the order of 2 kg./cm.

Still another suitable filter mat is a non-woven material comprising cellulose and rayon filters held together by a suitable organic binder and having activated carbon particles dispersed throughout for improved adsorption capacity. This mat is also conveniently prepared using standard paper-making apparatus and may, if desired, contain polyester fibers and the aforesaid micro-bits, the latter serving, inter alia, to prevent dusting of the carbon particles from the mat. Such a mat is commercially available from Crane & Co., Inc., Dalton, Mass. A mat of this type having porosity from about 150 to about 450 liters per minute per square decimeter at a pressure differential of 2.54 cm. of water (gauge) is very effective, particularly in conjunction with the introduction of an atomized water spray into the filter chamber, in filtering smoke-laden gases or vapors.

The use of a support grid which rides on sealing flanges along the marginal edges makes it possible to minimize the expense of fabrication of the filter mat since the filter mat is not required to have sufficient rigidity to be self-sustaining as it is advanced through the filter chamber. Furthermore, the edge portions of the filter mat need not be specially formed to provide a seal with the side walls of the filter chamber and irregular edges may be tolerated without adversely affecting the filtering capacity of the apparatus since the irregularities in the edges overlie the flanges 33 and do not permit leakage of gaseous medium through the irregularities, as would be the case in prior art arrangements. The composite filter medium consisting of the mat 39 and grid 22 simplifies recovery operations. In some applications, the particulate matter can be washed from the filter mat and discarded to enable the mat to be recycled. In other applications, the particulate matter may be recovered from the mat and salvaged, and the spent mat may be discarded. For these several reasons, the present invention provides an apparatus which may utilize filter mats which are fabricated and wound onto rolls for use in the present apparatus at minimum expense.

While a particular embodiment of the present invention has been herein illustrated and described it is not intended to limit the invention to such disclosures but changes and modifications may be made therein and thereto within the scope of the following claims.

I claim:

1. A roll type filter apparatus having a filter chamber with an inlet for receiving gaseous medium, an outlet for discharging filtered gaseous medium, said filter chamber having opposite side walls defining between them a path for the gaseous medium from said inlet to said outlet, a filter medium spanning across said filter chamber between said side walls and having opposite edge portions disposed adjacent the respective side walls, said filter medium comprising a support grid and a filter mat substantially co-extensive with said support grid, and means to guide said medium in a predetermined path through said filter chamber with one surface facing upstream toward said inlet and the opposite surface facing downstream toward said outlet, said support grid being on the downstream side of said filter mat;

flange means projecting inwardly of said chamber from said sidewalls, said flange means being disposed on said opposite side walls in alignment with said predetermined path to underlie the edge portions of said filter medium on the downstream or outlet side of said filter medium and occupy the space between said filter medium and said side walls, and having a series of apertures disposed in longitudinally-spaced relation along the length of said flange means;

means to advance said filter medium longitudinally through said filter chamber between said flange means with the side edges of said filter medium overlying the free edges of said flange means; and means to assemble the mat of said filter medium onto said support grid and feed the assembled filter medium into the filter chamber with the opposite edge portions overlying the upstream surface of the respective flange means including the series of apertures, said apertures operable to provide fluid communication between the filter chamber outlet and the upstream surface of said flange means in the area where said medium is in overlying relation therewith to effect intimate engagement therebetween, whereby gaseous medium flowing through said filter chamber must pass through said filter medium in its travel from said inlet to said outlet.

2. Apparatus according to claim 1 wherein said guide means includes a foraminous shelf extending across the entire space between said respective flange means to underlie and support said support grid across the full width between the side walls of said filter chamber.

3. Apparatus according to claim 1 wherein said guide means for said filter medium is constructed and arranged to dispose said medium in a zig zag path between an entrance end of said filter chamber and an exit end thereof, and including means to disassemble said filter mat from said support grid at said exit end, whereby said filter mat and support grid follow said zig zag path together through said filter chamber.

4. Apparatus according to claim 3 wherein said guide means includes a first series of parallel turning rolls disposed across the inlet of said chamber and a second series of parallel turning rolls disposed across the outlet of said chamber, said zig zag path extending alternatively between said turning rolls of the first and second series.

5. Apparatus according to claim 1 wherein said support grid comprises foraminous non-metallic screening fabric disposed in an endless loop, said guide means being constructed and arranged to cycle said loop through said filter chamber in said predetermined path.

6. Apparatus according to claim 5 wherein said foraminous support grid is a woven screen of polytetrafluorethylene glass fabric.

7. Apparatus according to claim 1 wherein said filter mat comprises a web of glass fibers with microbits of a synthetic polymer material combined with said fibers together with a binding agent to produce a mat which is permeable to gaseous flow.

8. Apparatus according to claim 7 wherein said filter mat includes an intimate blend or cobeat of cellulose fibers and said microbits and a wet-strength enhancing agent.

9. Apparatus according to claim 1 wherein said filter mat comprises a web of cellulose and rayon fibers having activated carbon particles dispersed therein together with a binding agent to produce a mat which is permeable to gaseous flow, said mat having porosity from about 150 to about 450 liters per minute per square decimeter at a pressure differential of 2.54 cm. of water (gauge).

10. Apparatus according to claim 9 wherein said filter mat includes polyester fibers and micro-bits of a synthetic polymer material.

* * * * *